United States Patent [19]

Freese et al.

[11] Patent Number: 5,401,311
[45] Date of Patent: Mar. 28, 1995

[54] METHOD FOR REMOVING DEPOSITS FROM COOLING WATER SYSTEMS

[75] Inventors: Donald T. Freese, Glenside; Raymond M. Post, Langhorne; David M. Polizzotti, Yardley, all of Pa.

[73] Assignee: Betz Laboratories, Inc., Trevose, Pa.

[21] Appl. No.: 183,442

[22] Filed: Jan. 14, 1994

Related U.S. Application Data

[63] Continuation of Ser. No. 992,194, Dec. 17, 1992, abandoned.

[51] Int. Cl.⁶ ............... C23G 1/02; C11D 3/066
[52] U.S. Cl. ........................... 134/2; 134/3; 134/22.14; 134/22.19; 134/28; 134/41
[58] Field of Search ............ 134/2, 3, 22.14, 22.16, 134/22.17, 22.19, 28, 41; 252/82, 174.16, 525, 526, 544, 545, DIG. 11; 210/699

[56] References Cited

U.S. PATENT DOCUMENTS

| | | | |
|---|---|---|---|
| 3,297,580 | 1/1967 | Pitzer | 252/142 |
| 3,492,238 | 1/1970 | Wohlberg | 134/3 |
| 3,523,835 | 8/1970 | Turner | 134/3 |
| 4,190,463 | 2/1980 | Kaplan | 134/3 |
| 4,540,443 | 9/1985 | Barber | 134/3 |
| 4,659,481 | 4/1987 | Chen | 210/697 |
| 4,789,406 | 12/1988 | Holder et al. | 134/3 |
| 4,810,405 | 3/1989 | Waller et al. | 134/2 X |
| 4,952,324 | 8/1990 | McDonald et al. | 210/697 |
| 4,978,456 | 12/1990 | Sprague | 210/699 |
| 5,024,783 | 6/1991 | Busch et al. | 252/180 |
| 5,100,558 | 3/1992 | Brown et al. | 210/699 |

*Primary Examiner*—Scott Kastler
*Assistant Examiner*—Saeed T. Chaudhry
*Attorney, Agent, or Firm*—Alexander D Ricci; Richard A. Paikoff

[57] ABSTRACT

Methods and compositions for removing deposits from surfaces in contact with the water of a cooling water system are disclosed. The combination of a chelant, a phosphonate or phosphate compound, and a base is effective in removing clay deposits from such surfaces.

12 Claims, No Drawings

METHOD FOR REMOVING DEPOSITS FROM COOLING WATER SYSTEMS

This is a continuation of application Ser. No. 07/992,194, filed Dec. 17, 1992, now abandoned.

FIELD OF THE INVENTION

The present invention is directed toward methods and compositions for removing deposits, such as clay deposits, from surfaces in contact with the water of a cooling water system.

BACKGROUND OF THE INVENTION

In cooling water systems, accumulations of clays are troublesome in that they reduce heat transfer efficiency of heat exchangers and the like. Also, accumulations of deposits on cooling tower fill reduce the evaporative efficiency of the cooling tower. In many instances, these deposits must be mechanically cleaned when they are present in excessive amounts. Hydrofluoric acid and ammonium bifluoride are known to dissolve silicas, silicates and clays. These compounds, however, would be unacceptable to remove deposits from surfaces in contact with cooling water systems, for several reasons. Both compounds are extremely hazardous and toxic. The compounds are also highly corrosive to metals. The ammonia from the ammonium bifluoride is also known to be corrosive to metals made from copper. (Heat exchangers in cooling systems are often made from metals that contain copper.) These compounds also introduce the possibility of calcium fluoride scale formation which would reduce heat transfer. Cement is commonly used to construct cooling tower sumps and other structural parts. Since cement is a silicate, it would dissolve in the presence of the fluoride compounds.

The present invention is directed toward methods and compositions for chemically cleaning clay deposits from metal surfaces, particularly from heat exchange surfaces in cooling water systems, and non-metal surfaces such as plastic cooling tower fill. Moreover, the present invention is more effective in removing deposits than e.g., ammonium bifluoride.

PRIOR ART

Most currently practiced cooling system chemical cleaning procedures for removing deposits require depression of the system pH to an acidic range (e.g., 3-5) for several hours or several days. Such acid cleaning procedures are directed toward removing or dissolving acid-soluble solids (e.g. $CaCO_3$, $Ca_3(PO_4)_2$, iron oxide, etc.) Clays and silicas are not soluble in acid solutions.

In such cleaning approaches, although deposit removal may be effected, high corrosion rates are experienced by reason of the maintenance of low pH during the process. For instance, in U.S. Pat. No. 4,190,463 (Kaplan), iron oxide deposits are removed from heat transfer systems by first contacting the deposits with an aqueous solution of a hydrolyzable tannin extract followed by subsequent use of dilute solutions of citric acid. The pH of the cooling system water should be maintained at about 2.8-3.0 during the citric acid addition step. At column 7, line 15 of the '463 patent, it is stated that use of citrates at higher pH's for long times are not effective for removing modified deposits.

In U.S. Pat. No. 3,297,580 (Pitzer), substantially neutral pH chemical cleaning compositions and methods are disclosed. These compositions and methods are directed toward removing oxide films from iron and ferrous alloys in inaccessible places. The cleaning compositions that are employed have a pH range of between 6.5 and 9.5 and involve utilization of buffered aqueous solutions of hydrazine and polycarboxylamine acid chelating agents. The preferred metal oxide is magnetite ($Fe_3O_4$) and the preferred temperatures are 90° to 100° C. The presence of hematite ($Fe_2O_3$) and other nonmetallic oxides in industrial systems and the normal system operating temperatures may have discouraged this approach.

In U.S. Pat. No. 4,789,406 (Holder) methods for removing iron oxide and other corrosion products from metal surfaces in contact with cooling water systems are disclosed. The aforementioned references do not disclose the use of specific chemical treatments to remove clay deposits from cooling water systems.

DETAILED DESCRIPTION OF THE INVENTION

In accordance with the present invention, a method of improving the efficiency of a cooling tower and removing deposits from surfaces in contact with the water of a cooling water system is disclosed. The method comprises first adding to the water a chelant, which reduces the soluble hardness level (e.g., free or uncomplexed calcium and magnesium) of the water system to less than about 200 ppm as $CaCO_3$. Examples of suitable chelants are ethylenediaminetetraacetic acid (EDTA) or citric acid. With the hardness level in the system complexed by the chelant, the clays (which contain calcium) swell.

The pH of the system water is maintained within the range of from about 7 to about 11 throughout the entire program, thus minimizing the potential for corrosion which exists in many of the prior art treatment approaches utilizing low acid pH's for the cleaning methods. Bases such as $Na_2CO_3$, $NaHCO_3$, NaOH etc., may be used to adjust pH.

A sodium salt, such as $Na_2SO_4$, NaCl, $NaHCO_3$, $Na_2CO_3$, etc., at from about a trace to about 10,000 ppm may optionally be added to improve the deposit removal. The sodium from the base, the chelant, or the naturally occurring sodium level in the cooling tower water may eliminate the requirement to add a sodium salt.

Subsequent to the addition of chelant to the aqueous system, a phosphonate or phosphate compound of from about 300-20,000 ppm is added. Exemplary phosphonate compounds include hydroxyphosphonoacetic acid, or preferably 1-hydroxyethylidene-1,1-diphosphonic acid (HEDP). Exemplary phosphate compounds comprise tetrapotassium pyrophosphate (TKPP), sodium tripolyphosphate (STPP) or sodium hexametaphosphate (SHMP).

The treatment takes place over a period of from about 1 to 5 days until the deposits are removed from the affected surfaces. It is noted that, in order for the program to be effective, the pH of the cooling water system should be maintained within the range of from about 7 to 11. As will be shown, in certain instances, efficacy of deposit removal is enhanced at higher pH's in this range.

The methods and compositions of the invention are designed to penetrate and remove accumulated deposits from heat transfer surfaces and cooling tower fill surfaces. Unlike many of the conventional cleaning methods, the method is performed with the cooling system on-line (i.e., still operating) and at a pH from about 7 to 11. The unique ability to clean the system effectively without removing it from service can result in considerable savings in unit downtime. Many companies specializing in chemical cleaning do not offer effective on-line cleaning programs. As the cleaning method of the present invention removes clay deposits at a 7-11 pH range, copper alloy and mild steel equipment does not require isolation, and corrosion occurring during the cleanup is minimized. The present invention provides a distinct advantage over the traditional removal of silicas and silicates accomplished via the use of hydrofluoric acid and ammonium bifluoride solutions, which have the potential to cause serious damage to heat exchangers and associated valves and piping.

The components of the present invention perform their functions concurrently so there is no need for a pretreatment step. The chemicals are allowed to recirculate under normal operating temperatures (about 40° F. to 160° F. with about 100° F. being most preferred) for cooling towers until the deposits have been removed (approximately 1 to 5 days). The cooling tower is then blown down and the normal cooling tower operation is resumed. Most of the removed solids will exit with the blowdown water.

EFFICACY OF THE PRESENT INVENTION

In order to demonstrate the efficacy of the present invention in the removal of deposits from surfaces in contact with the water of a cooling water system, the following experiments were performed. The experiments should be construed as being illustrative, and not as restricting the scope of the invention.

The following beaker test procedure was used:
1. Cut fouled fill into coupons (approximately 2.5×0.5 inches).
2. Air dry tower fill coupons at room temperature.
3. Photograph coupons (unexposed).
4. Weigh coupons (initial weight).
5. Place coupons on holders (PVC rod with nylon screw).
6. Soak coupons in untreated test solution (control) for one-half hour with slow stirring.
7. Place 1.0 liter of test solutions in beakers and mix.
8. Add treatments and adjust pH if appropriate.
9. Immerse pre-soaked coupons in recirculating test water.
10. Remove coupons after specified time (about 3 days).
11. Weigh coupons when dry (air-dried at room temperature).
12. Photograph coupons (exposed).
13. Manually remove remaining deposits and weigh coupons when dry.

EXAMPLE 1

Fouled Cooling Tower Fill from a Northwest U.S. Cooling System

Cooling towers use fill, or packing, to keep the water distributed evenly and to increase the water surface area for more efficient evaporation. Fill deposit in this example was analyzed to be primarily clay (montmorillonite as indicated from the infrared spectrum) with a minor amount of calcium carbonate. Elemental analysis showed: 51% $SiO_2$, 21% LOI (loss on ignition) 9% $Al_2O_3$, 5% $Fe_2O_3$, 5% ZnO, 4% CaO, 3% MgO, 2% $K_2O$. The effectiveness of EDTA in combination with other components in the present invention is particularly apparent. Citric acid is less effective than EDTA.

| Test 1 | |
|---|---|
| Water composition | 980 ppm Ca, 630 ppm Mg, 6 ppm M alk (all as $CaCO_3$) |
| Test Duration | 5 days |
| Stirring Rate | 300 rpm with a magnetic stir bar |

| Treatment | Initial pH | % Deposit Removal |
|---|---|---|
| Untreated | 9 | 41.3 |
| 600 ppm HEDP, .025 M $Na_4EDTA$ | 9 | 97.7 |
| 600 ppm TKPP, .025 M $Na_4EDTA$ | 9 | 97.3 |
| 1200 ppm TKPP, .025 M $Na_4EDTA$ | 9 | 98.5 |
| 600 ppm HEDP, 500 ppm $NaHCO_3$, 500 ppm $Na_2CO_3$ | 9 | 36.8 |

| Test 2 | |
|---|---|
| Water Composition | 980 ppm Ca, 630 ppm Mg, 46 ppm M alk (all as $CaCO_3$) |
| Test Duration | 3 days (2 days where noted with a *) |
| Stirring Rate | 300 rpm with a magnetic stir bar |

| Treatment | Initial pH | % Deposit Removal |
|---|---|---|
| Untreated | 7 | 22.1 |
| 600 ppm TKPP, 1000 ppm $Na_2SO_4$, 0.01 M $Na_4EDTA$ | 9 | 56.4* |
| 600 ppm HEDP, 1000 ppm $Na_2SO_4$, 0.01 M $Na_4EDTA$ | 9 | 87.3* |
| 600 ppm TKPP, 1000 ppm $Na_2SO_4$, 0.01 M citric acid | 9 | 55.5* |
| 600 ppm HEDP, 1000 ppm $Na_2SO_4$, 0.01 M citric acid | 9 | 24.3* |

| Test 3 | |
|---|---|
| Water Composition | 980 ppm Ca, 630 ppm Mg, 46 ppm M alk (all as $CaCO^3$) |
| Test Duration | 3 days |
| Stirring Rate | 300 rpm with a magnetic stir bar |

| Treatment | Initial pH | % Deposit Removal |
|---|---|---|
| Untreated | 8 | 38.0 |
| 300 ppm HEDP, 1000 ppm $Na_2SO_4$, 0.016 M $Na_4EDTA$ | 9 | 92.4 |
| 600 ppm HEDP, 1000 ppm $Na_2SO_4$, 0.016 M $Na_4EDTA$ | 9 | 98.1 |

| Test 4 | |
|---|---|
| Water Composition | 800 ppm Ca, 510 ppm Mg, 38 ppm M alk (all as $CaCO_3$) |
| Test Duration | 1 day |
| Stirring Rate | 300 rpm with a magnetic stir bar |

| Treatment | Initial pH | % Deposit Removal |
|---|---|---|
| Untreated | 8 | 38.4 |
| 600 ppm HEDP, 1000 ppm $Na_2SO_4$, 0.013 M $Na_4EDTA$ | 9 | 94.1 |
| 600 ppm HEDP, 0.013 M $Na_4EDTA$ | 9 | 91.8 |
| 600 ppm HEDP, 1000 ppm $Na_2SO_4$, 0.009 M $Na_4EDTA$ | 9 | 91.5 |
| 1000 ppm SHMP, 1000 ppm $Na_2SO_4$, 0.013 M $Na_4EDTA$ | 9 | 92.5 |
| 1000 ppm STPP, 1000 ppm $Na_2SO_4$, 0.009 M $Na_4EDTA$ | 9 | 92.5 |

EXAMPLE 2

Fouled Cooling Tower Fill from a Southeast Cooling System

Fill deposit was analyzed to be primarily clay (kaolin) with a minor amount of calcium carbonate. The elemental analysis showed: 50% $SiO_2$, 15% $Al_2O_3$, 10% $Fe_2O_3$, 15% LOI, 5% MgO, 5% $CaCO_3$.

Water composition—69 ppm Ca as $CaCO_3$, 22.5 ppm Mg as $CaCO_3$, 60 ppm M alk.

Test 1
Test Duration 4 days
Stirring Rate 300 rpm magnetic stir bar

| Treatment | Initial pH | % Deposit Removal |
|---|---|---|
| Untreated | 6.7 | 51.4 |
| 600 ppm HEDP, 1000 ppm $Na_2SO_4$, 0.002 M $Na_4EDTA$ | 9 | 84.5 |
| 6000 ppm HEDP, 10,000 ppm $Na_2SO_4$, 0.002 M $Na_4EDTA$ | 9 | 82.8 |

Test 2
Test Duration 2 days
Stirring Rate 100 rpm with paddle stirrer

| Treatment | Initial pH | % Deposit Removal |
|---|---|---|
| Untreated | 6.7 | 56.2 |
| 600 ppm HEDP, 0.002 M $Na_4EDTA$, 336 ppm $NaHCO_3$ | 11 | 93.0 |
| 600 ppm HEDP, 0.002 M $Na_4EDTA$, 336 ppm $NaHCO_3$ | 9 | 81.8 |
| 1000 ppm PBTA*, 0.002 M $Na_4EDTA$, 336 ppm $NaHCO_3$ | 9 | 50.0 |
| 500 ppm HPAA**, 0.002 M $Na_4EDTA$, 336 ppm $NaHCO_3$ | 9 | 85.3 |

*2-phosphono-butane-1,2,4-tricarboxylic acid
**hydroxyphosphonoacetic acid

EXAMPLE 3

Fouled Cooling Tower Fill from a Northeast U.S. Cooling System

Fill deposit was analyzed to be primarily clay with calcium carbonate. The elemental analysis showed: 29% $SiO_2$, 23% CaO, 18% $CO_2$, 16% LOI, 5% $Al_2O_3$, 2% $Fe_2O_3$, 2% MgO, 2% $K_2O$, 2% CuO.

Water composition—319 ppm Ca as $CaCO_3$, 117 ppm Mg as $CaCO_3$.

Test 1
Test Duration 18 hours
Stirring Rate 100 rpm paddle stirrer

| Treatment | Initial pH | % Deposit Removal |
|---|---|---|
| Untreated | 7 | 21.8 |
| 600 ppm HEDP, 0.0044 M $Na_4EDTA$ | 7 | 92.6 |

EXAMPLE 4

Fouled Cooling Tower Fill from a Southeast U.S. Cooling System

Fill deposit was analyzed to be primarily silica and clay, with a minor amount of calcium carbonate. The elemental analysis showed: 39% LOI, 2% S, 2% MgO, 5% $Al_2O_3$, 42% $SiO_2$, 4% CaO, 5% $Fe_2O_3$, 1% CuO.

Water composition—732 ppm Ca as $CaCO_3$, 408 ppm Mg as $CaCO_3$, 12 ppm Mg as $CaCO_3$, 12 ppm $SiO_2$, 50 ppm M alk.

Test 1
Test Duration 22 hours
Stirring Rate 100 rpm paddle stirrer

| Treatment | Initial pH | % Deposit Removal |
|---|---|---|
| Untreated | 7 | 32.4 |
| 600 ppm HEDP, 0.006 M $Na_4EDTA$ | 7 | 48.2 |
| 600 ppm HEDP, 0.012 M $Na_4EDTA$. | 7 | 72.3 |
| 600 ppm HEDP, 0.012 M $Na_4EDTA$, 336 ppm $NaHCO_3$ | 9 | 87.2 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of removing clay deposits from surfaces in contact with the water of a cooling water system comprising the steps of:
    (a) maintaining the pH of said water within the range of from about 7 to about 11 throughout the entire method;
    (b) adding to said water a chelant selected from the group consisting of ethylenediaminetetraacetic acid and citric acid;
    (c) subsequently adding to said water a phosphonate or phosphate compound; and
    (d) blowing down said cooling water to remove said deposits.

2. The method as recited in claim 1 wherein said phosphonate compound is 1-hydroxyethylidene-1,1-diphosphonic acid or hydroxyphosphonoacetic acid.

3. The method as recited in claim 2 wherein from about 300 to 20,000 parts of phosphonate compound is added per million parts of water.

4. The method as recited in claim 1 wherein said phosphate compound is tetrapotassiium pyrophosphate, sodium tripolyphosphate or sodium hexametaphosphate.

5. The method as recited in claim 4 wherein from about 300 to 20,000 parts of phosphate compound is added per million parts of water.

6. The meethod as recited in claim 1 wherein said surfaces in contact with the water of a cooling water system comprise plastic cooling tower fill.

7. A method of removing clay deposits from surfaces in contact with the water of a cooling water system consisting essentially of the steps of:
    (a) adding to said water from about 0.002–0.016 moles per liter of a chelant selected from the group consisting of ethylenediaminetetraacetic acid and citric acid;
    (b) subsequently adding to said water from about 300–20,000 parts per million of a phosphonate or phosphate compound; and
    (c) blowing down said cooling water to remove said deposits, the pH of said water being within the range of from about 7 to about 11.

8. The method as recited in claim 7 wherein said phosphonate compound is 1-hydroxyethylidene-1,1-diphosphonic acid or hydroxyphosphonoacetic acid.

9. The method as recited in claim 8 wherein about 600 to 1000 parts of phosphonate compound is added per million parts of water.

10. The method as recited in claim 7 wherein said phosphate compound is tetrapotassium pyrophosphate, sodium tripolyphosphate or sodium hexametaphosphate.

11. The method as recited in claim 10 wherein about 600 to 1000 parts of phosphate compound is added per million parts of water.

12. The method as recited in claim 9 wherein said surfaces in contact with the water of a cooling water system are non-metal surfaces.

* * * * *